United States Patent
Roeger et al.

(10) Patent No.: US 9,318,134 B2
(45) Date of Patent: Apr. 19, 2016

(54) ATTACHING OPTICAL COMPONENTS USING HOMOGENIZED LASER LIGHT

(71) Applicant: Seagate Technology LLC, Cupertino, CA (US)

(72) Inventors: Brent C. Roeger, Minneapolis, MN (US); Karim Tatah, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 292 days.

(21) Appl. No.: 13/907,011

(22) Filed: May 31, 2013

(65) Prior Publication Data

US 2013/0322822 A1 Dec. 5, 2013

Related U.S. Application Data

(60) Provisional application No. 61/654,447, filed on Jun. 1, 2012.

(51) Int. Cl.
| | |
|---|---|
| *G11B 5/48* | (2006.01) |
| *G11B 5/127* | (2006.01) |
| *G11B 5/105* | (2006.01) |
| *G11B 5/00* | (2006.01) |
| *B23K 1/005* | (2006.01) |

(52) U.S. Cl.
CPC ........... *G11B 5/4806* (2013.01); *B23K 1/0056* (2013.01); *G11B 5/105* (2013.01); *G11B 5/1272* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,278,078 | B1 | 8/2001 | Walvoord et al. | |
| 6,627,847 | B1 | 9/2003 | Hu et al. | |
| 8,149,653 | B2 * | 4/2012 | Shimazawa | G11B 5/105 369/112.27 |
| 8,248,895 | B2 * | 8/2012 | Shimazawa | G11B 5/314 369/112.27 |
| 8,248,897 | B2 * | 8/2012 | Shimazawa | G11B 5/314 360/59 |
| 8,250,737 | B2 * | 8/2012 | Shimazawa | B82Y 10/00 29/603.07 |
| 8,274,867 | B2 * | 9/2012 | Mori | G11B 5/314 369/13.13 |
| 8,393,074 | B1 * | 3/2013 | Takayama | G11B 5/314 250/201.3 |
| 8,590,138 | B2 * | 11/2013 | Hara | G11B 5/6088 29/603.01 |

* cited by examiner

*Primary Examiner* — John M Bedtelyon
(74) *Attorney, Agent, or Firm* — Hollingsworth Davis, LLC (57) ABSTRACT

An attachable optical component is aligned with a base optical component. The attachable optical component has a mounting surface interfacing with the base optical component and an exposed surface opposed to the mounting surface. Laser light is directed to the exposed surface of the attachable optical component for delivery to the mounting surface. The attachable optical component guides and homogenizes the laser light delivered to the mounting surface and uniformly heats a bonding feature between the mounting surface and the base optical component. The directing and subsequent removing of the laser light bonds the attachable optical component to the base optical component via the bonding feature.

13 Claims, 5 Drawing Sheets

ATTACHING OPTICAL COMPONENTS USING HOMOGENIZED LASER LIGHT

CROSS REFERENCE TO RELATED CASES

This application claims the benefit of Provisional Patent Application Ser. No. 61/654,447 filed on Jun. 1, 2012, to which priority is claimed pursuant to 35 U.S.C. §119(e) and which is hereby incorporated herein by reference in its entirety.

SUMMARY

The present disclosure is directed to methods and apparatuses usable for attaching optical components using homogenized laser light. In one embodiment, a method involves aligning an attachable optical component with a base optical component. The attachable optical component has a mounting surface interfacing with the base optical component and an exposed surface opposed to the mounting surface. Laser light is directed to the exposed surface of the attachable optical component for delivery to the mounting surface. The attachable optical component homogenizes the laser light delivered to the mounting surface and uniformly heats a bonding feature between the mounting surface and the base optical component. The laser light is removed from the exposed surface. The directing and removing of the laser light bonds the attachable optical component to the base optical component via the bonding feature These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to magnetic recording devices used for data storage. Methods and apparatuses are described hereinbelow that facilitate assembly of very small scale optical devices. These assembly techniques may be used, for example, in assembling heat-assisted magnetic recording (HAMR) devices, which may also be described as thermal-assisted magnetic recording (TAMR) and energy-assisted magnetic recording (EAMR). Generally, a HAMR device uses a laser diode or other energy source to heat a magnetic medium while it is being recording.

A HAMR data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole).

A HAMR read/write head, sometimes referred to as a slider, includes magnetic read and write transducers similar to those on current hard drives. For example, data may be read by a magnetoresistive sensor that detects magnetic fluctuations of the moving medium. Data may be written to the magnetic medium by a write coil that is magnetically coupled to a write pole. A HAMR slider may also include a source of energy, such as a laser diode, and an optical delivery path through the slider that delivers the energy to the surface of the medium. In some configurations, the laser diode is a separately-manufactured device that is attached to the slider. During the attachment procedure, it is desirable to precisely align the laser diode to the slider during assembly to minimize optical transmission losses in the optical delivery path. This alignment can be challenging due to, among other things, the small size of the laser diode and slider, which have may have dimensions on the order of 500 µm.

Figure 1:
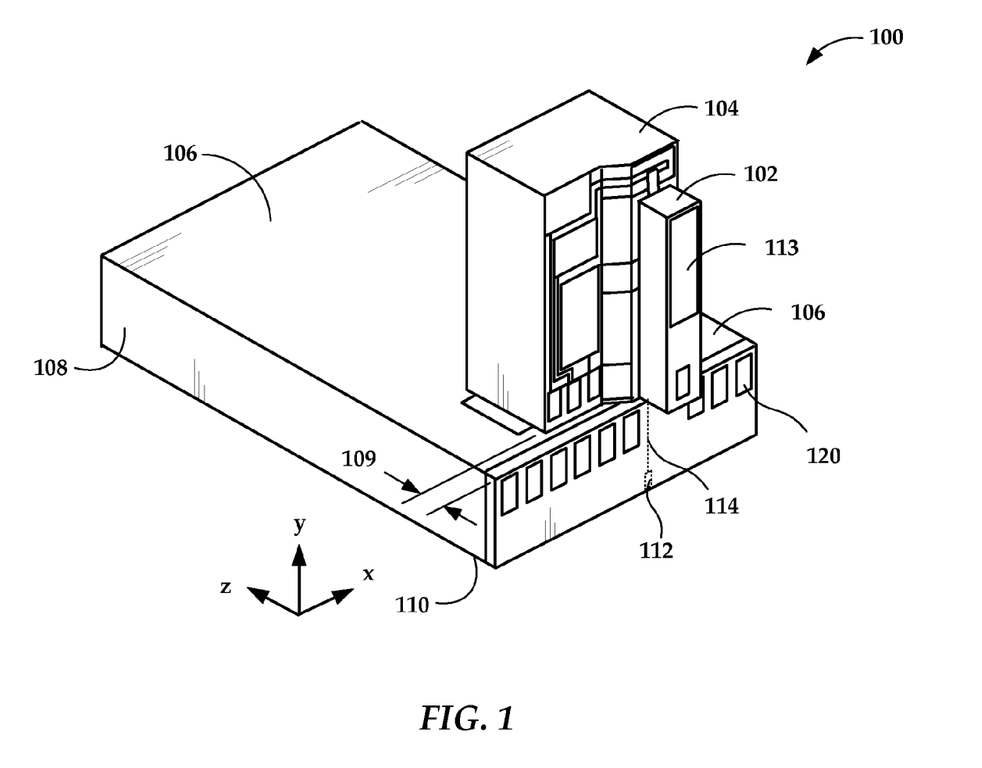
FIG. 1 is an isometric view of a heat-assisted, magnetic recording, hard drive slider according to an example embodiment.

In reference now to FIG. 1, a perspective view shows a HAMR slider assembly 100 according to an example embodiment. In this example, a laser diode 102 is mounted to a submount 104, and the submount 104 coupled to a top surface 106 of a slider body 108. The laser diode 102 in this example is an edge-emitting laser, and emits light in the negative y-direction. Among other things, the submount 104 orients the laser output in the desired direction so that it can be directly coupled to an optical pathway 114 within the slider body 108. The optical pathway 114 directs the energy so that it is emitted from a media-facing surface 110 of the slider body 108, thereby heating a proximate magnetic medium (not shown) that moves underneath the slider assembly 100.

The media-facing surface 110 may be configured as an air-bearing surface (ABS) that maintains a cushion of air between the slider body 108 and recording medium. A transducer region 112 of the slider body 108 includes at least a write transducer that generates a magnetic field and an optical transducer that receives energy from the laser diode 102 and directs the energy to the recording medium. The optical transducer may include a near-field transducer (NFT) that directs the energy via surface plasmon resonance. The optical coupling path 114 includes optical components (e.g., waveguides, mirrors, couplers, decouplers, etc.) that are integrated in the slider body 108 and facilitate delivering energy from the laser 102 to the transducer region 112.

In the illustrated slider assembly 100, the laser diode 102, submount 104 and slider body 108 are formed separately using integrated circuit/optics manufacturing techniques known in the art. For example, the components may be formed by (among other things) depositing layers of material on a wafer substrate, creating features in the layers using photolithography and chemical/mechanical polishing, and dividing the wafer into individual components. Afterwards, the laser diode 102 is bonded (e.g., soldered) to the submount 104, and the submount 104 is then bonded to the slider body 108. This may occur in another order, e.g., the submount 104 may be bonded to the slider body 108 before the laser diode 102 is attached. In either case, it is desirable to precisely align the output of the laser diode 102 with the optical coupling path 114 to minimize optical losses.

For purposes of the following discussion, optical components such as the laser diode 102, submount 104, and slider body 108 may be referred to as a base component and/or an attachable component. In some cases, the base component may be larger than the attachable component, but not necessarily so. Generally, a mounting surface of the attachable component is aligned with a mounting surface of the base component. An exposed surface of the attachable component (e.g., surface opposed to the mounting surfaces) is subjected to laser light which travels through the attachable component to the mounting surface.

The attachable component may homogenize, at least in part, the laser light delivered to the mounting surface in order to uniformly heat a bonding feature at the mounting surfaces between the components. The bonding feature may include a solder pad, bond line, bond layer, etc. As will be described below, the homogenization of the laser light through the body of the attachable component facilitates accurate bonding of the component by minimizing thermal expansion of tooling that holds the components.

Figure 2:
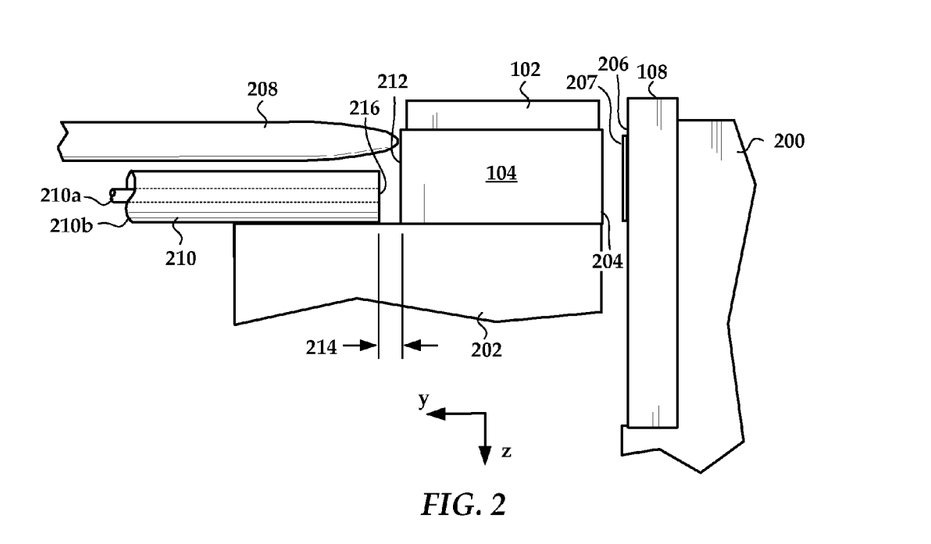
FIG. 2 is a block diagram illustrating tooling used for bonding an attachable component with a base component according to an example embodiment.

In reference now to FIG. 2, a block diagram illustrates tooling used for bonding an attachable component with a base component according to an example embodiment. For purposes of this discussion, the previously described submount 104 will be configured as the attachable component, and the previously described slider body 108 will be configured as the base component. The slider body 108 is held by a fixture 200, e.g., slider chuck tooling. Similarly, fixture 202 (e.g., submount chuck tooling) holds submount 104 with already-attached laser diode 102. The fixtures 200, 202 are arranged so that a mounting surface 204 of the submount 104 faces a bonding region 206 of the slider body 108. The boding region 206 includes a bonding feature 207, such as solder or adhesive.

For purposes of clarity in the drawing, the mounting surface 204 is shown separated from the bonding region 206. The fixtures 200, 202 may be aligned so that, just before assembly, the submount 104 is positioned with the mounting surface 204 aligned with, but not yet in contact with, the bonding region 206. A half-round clamp 208 holds the submount 104 and laser diode 102 into the position so that the mounting surface 204 is in contact with, the bonding feature 207. In this example, the fixture 200 holding the slider body 108 is moved in place for final assembly, although the bonding techniques described herein may be applicable to other fixture configurations (e.g., with submount fixture 202 and/or clamp 208 being movable and slider fixture 200 being fixed). After this positioning, the submount 104 is bonded to the slider body 108 via the application and subsequent removal of heat. For example, the bonding feature 207 (which may be located on the bonding region or mounting surface 204) may include one or more of solder pads, bond lines, bond layers, etc., that bond the submount 104 to the slider body 108 when heated to a predetermined temperature and then cooled.

One of the difficulties in maintaining optical alignment between the submount 104 and slider body 108 (or any similar optical components) is controlling thermal expansion of the surrounding materials when the bonding feature 207 is cured/reflowed. If the heat is applied to the tooling assembly (e.g., in an oven), the fixture components 202, 202, 208 and other tooling components undergo a thermal expansion. Even if externally applied heat is localized near the bonding region 206, enough stray energy (e.g., due to reflections, radiative heat transfer, etc.) may cause tooling expansion. The thermal expansion of the tooling may move the relative position of the slider body 108 and submount 104, which then reduces optimal optical alignment of the two components, e.g., an alignment of the output of the laser diode 102 with an optical pathway of the slider body 108.

To reduce thermal expansion of the tooling, the illustrated arrangement uses at least one cleaved optic fiber 210 that is positioned normal to an exposed surface 212 of the submount 104, the exposed surface being opposed to the mounting surface 204. A gap 214 between a cleaved facet 216 the optic fiber 210 and submount 104 is set to a clearance value that achieves optimal coupling efficiency. The optic fiber 210 includes a core 210*a* and cladding 210*b*. In one implementation, the core 210*a* is 100 μm in diameter, and the cladding 210*b* is 125 μm thick. The diameter of the core 210*a* is chosen not to extend beyond the exposed surface 212 of the submount 104. As discussed below, the diameter of the core 210*a* may be significantly smaller (e.g., less than half) than outer dimensions of the exposed surface 212. Various features of the submount 104 and/or slider 108 homogenize the light transmitted to the bonding feature 207, which results in even distribution of heat even when the energy originates from a small diameter core 210*a*.

Figure 3:
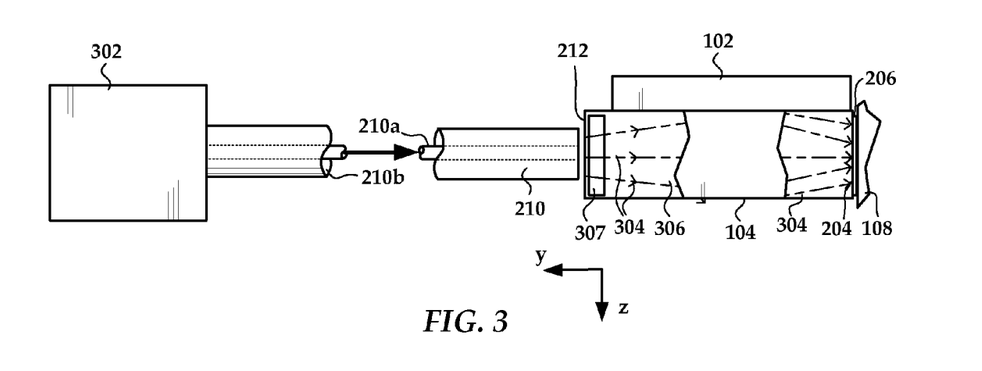
FIGS. 3 and 4 are block diagrams showing homogenization of laser beam in an attachable component according to an example embodiment.

In reference now to FIG. 3, a block diagram illustrates additional tooling components according to an example embodiment. A laser 302 is coupled to another end of the optic fiber 210 to supply light for heating the submount 104. The wavelength of light propagated by the optic fiber 210 can be substantially or partially transparent and substantially or partially absorbent to the material of interest. Generally, the wavelength may be chosen to be substantially absorbed (e.g., coefficient of attenuation or absorption>0.8) at the bonding region 206. The bonding region 206 surface (and/or the mounting surface 204) can reflect non-absorbed light or infrared beams back through the submount 104 for continued material absorbance. This technique creates uniform conductive heating at the mounting surface 204 without significant heating of nearby tooling. The uniform heating finalizes attachment of the mounting surface 204 to the bonding region 206, e.g., by curing bonding material, reflowing solder, etc.

Generally, a uniform light intensity profile at the submount's mounting surface 204 localizes the energy to the bonding region 206, which facilitates precisely aligning the submount 104 and laser diode 102 to the slider body 108. This uniform profile can be obtained by forming the submount 104 using materials and/or structures that guide and homogenize laser light 304 delivered to the mounting surface 204 and bonding region 206. For example, at least part of the submount 104 may include a rectangular prism 306 made of silicon. The rectangular prism 306 acts as a waveguide and homogenizer of the beam and delivers a flat-top intensity beam that translates into precise uniform heat impinging on the bonding feature. A grating structure 307 may be formed at the front facet of the submount (e.g., at exposed surface 212) to diffract beams with steep angles. In another example, the wavelength of applied laser light may be selected to be partially absorbed in the submount 104, which will also homogenize and diffuse the energy received from the laser. The submount 104 in such a configuration also guides the light (e.g., acts as a waveguide) while homogenizing the light through partial absorption.

The uniform or homogenized laser light beam may be obtained by coupling light power from the laser 302 to a bare multimode fiber 210. The diameter of the core 210*a* of the fiber 210 may be selected based on size of the exposed surface 212, distance between the exposed surface 212 and mounting surface 204, wavelength of light used, etc. In this example, the exposed surface 212 and mounting surface 204 are about 275×300 μm, and the y-direction distance between surfaces 204, 212 is about 525 μm. The laser diode 102 is about 100×100 μm on the x-z plane, and about 500 μm in the y-direction. The heat application laser 302 may have power from 1-40 watts, and a wavelength from 890 to 1300 nm. In such a case, the core 210a may have a diameter between 50 and 200 μm, such as 50, 62.5, 100, or 200 μm, with a 125 μm cladding 210b. Generally, the core 210a diameter may be selected so that a cross-sectional area of the cleaved output facet does not extend beyond the exposed surface 212 of the attachable optical component 104.

The specification of tooling components (e.g., laser 302 and optic fiber 210) will generally depend on at least the materials used in the construction of the attachable optical component, in this case the submount 104. For example, the materials used in homogenizer region 306 of the attachable optical component will have light-wavelength-dependent properties (e.g., absorptivity, reflectivity, emissivity, index of refraction) that may control how much energy is delivered to the bonding feature, and may control how effectively the component homogenizes the laser light. For example, the homogenizer region 306 may be substantially transparent, in which case internal structure such as prismatic features may assist in homogenization. Such considerations may also apply to the materials used in the base optical component and bonding feature, at least in how effectively these components and nearby regions absorb, reflect, and/or diffuse the homogenized light energy.

In the previous example, a silicon rectangular prism 306 is used as a homogenizer within the submount 104. As shown in Table 1 below, the absorption coefficient of silicon at 980 nm wavelength is nearly ten times that of 1064 nm. For a 525 μm submount length (along the y-direction as shown in FIG. 3), use of 1064 nm wavelength will potentially result in a much greater portion of the light impinging on the bonding feature than with 980 nm wavelength. This can be seen in the $P/P_{in}$ column, which is a percentage of input power reaching the mounting surface 204, and may be expressed as $P/P_{in} = (1-R) \exp(-\alpha L)$. In this example, a 1064 nm laser source will more efficiently heat the bonding feature through a silicon prism than will a 980 nm source.

TABLE 1

| Wavelength (nm) | Absorption coefficient, $\alpha$ ($cm^{-1}$) | Reflectivity, R (%) | $P/P_{in}$ (%) |
|---|---|---|---|
| 980 | 96 | 32 | .4 |
| 1064 | 9.5 | 31 | 41 |

Materials for the attachable component may be dictated by specifications of the manufactured device, and so other materials besides silicon may be used for an attachable component. Generally, for particular materials, a wavelength may be selected such that a significant portion of the applied energy reaches the bonding surfaces and bonding features without significant heating of the attachable component or tooling. In other cases, a feature such as a via or layer of alternate material may be provided in the attachable component that more effectively allows tooling as described herein to be used without interfering with the primary function of the assembled device. For example, the illustrated submount 104 performs structural and electrical functions related to aligning the laser diode 102 to the slider body 108 and providing electrical connections. In such a case, there may be some flexibility in what materials are chosen for the submount 104. In other cases, there may be no functional components at least between the exposed surface 212 and mounting surface 204. In such a case, the submount 104 may include structures in this region (e.g., vias or layers) that are optimized for this type of bonding. The bonding structures may perform little or no function after assembly, yet do not interfere with other regions and materials that do provide a function after assembly.

Figure 4:
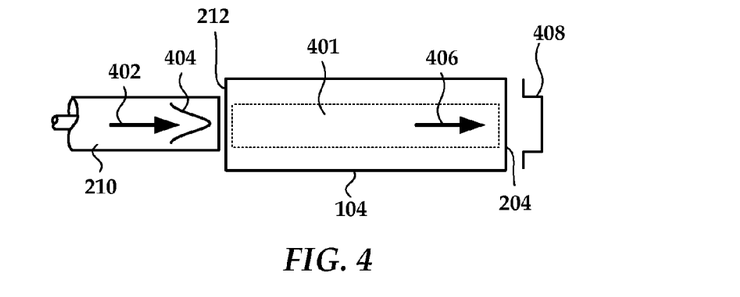

In reference now to FIG. 4, a block diagram illustrates laser beam homogenization within a submount 104 according to an example embodiment. The submount includes an optical homogenizer 401 (e.g., silicon prism) between the exposed surface 212 and mounting surface 204. Light 402 from a cleaved multimode fiber 210 has a Gaussian beam profile 404 and is end-coupled directly to the submount 104. The optical homogenizer 401 acts a like a wider waveguide that mixes the multiple angle rays 406 within the submount 104 and delivers a uniform beam profile 408 at the mounting surface 204 to be bonded.

The embodiments described above isolate the heating to a region of interest near one or more bonded components of interest. A bonding feature (e.g., solder) may be deposited onto the slider body 108 at the bonding region and heated to the solder reflow temperature to flow from the slider body 108 to the submount 104. The homogenized laser light facilitates heating the bonding region 206 and transfers heat through conduction to the solder or other bonding material on the slider body 108. These embodiments may be implemented with a single laser source and single cleaved fiber optic position normal to the submount. This design increases robustness of the optical design of the slider assemble, which results in an increased process window for solder reflow. Positioning the fiber optic close to the submount allows for maximum laser beam coupling which increases energy transfer efficiency.

While the examples shown above illustrate bonding of a laser submount to a slider body, it will be appreciated that this technique may be used with any electrical and/or optical components that use heat for bonding, such as where heating of fixtures holding the electrical and/or optical components may affect precision alignment therebetween. For example, a laser diode may be attached directly to a slider body without a submount. In such a case, the laser diode may be configured as an attachable component that includes one or more light homogenization regions that uniformly heat a mounting surface and/or bonding region between the laser diode and slider.

It will be understood many variations may be implemented based on the examples shown in FIGS. 2-3. One variation according to an example embodiment is shown in the block diagram of FIG. 5. In this example, a slider body may be configured as an attachable optical component 502, and a submount or laser diode may be configured as a base optical component 504. A bonding feature 506 is shown facing a bonding region 508 of the base optical component 504 and proximate a mounting surface 510 of the attachable optical component 502. It will be understood that the bonding feature 506 may be initially placed on either the mounting surface 510 or the bonding region 508.

Figure 5:
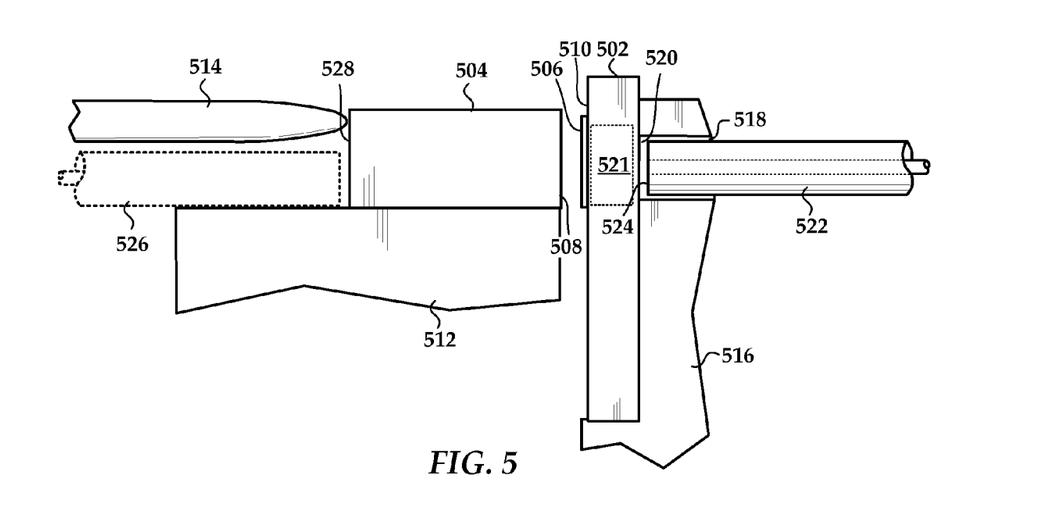
FIGS. 5 and 6 are block diagrams illustrating tooling used for bonding an attachable component with a base component according additional example embodiment.

The base optical component 504 is held by fixture portions 512, 514 similar to those previously shown described. Similarly, the attachable optical component 502 is held by a fixture 516. In this case, the fixture 516 includes a feature (e.g., void 518) that allows access to an exposed surface 520 of the attachable component 502. The attachable optical component 502 includes a region 521 that may be configured as a laser beam homogenizer (e.g., a prism or other optical homogenizing device) between the exposed surface 520 and mounting surface 510 such that laser light directed to the exposed surface 520 uniformly heats the bonding feature 506 to bond the attachable optical component 502 to the base optical component 504. The laser light is provided by an optic fiber 522 with a cleaved output facet 524. Generally, the region 521 should be free of metal or non-metal features that block light from the optic fiber 522 and prevent it from reaching the bonding feature 506.

It should be noted that if the attachable optical component 502 shown here is a slider, it is generally desirable to limit heating within the slider body. In such a case, the region 521 may be transparent to the wavelength of the laser light provided by the optic fiber 522, and other features may be used to homogenize the energy at the bonding feature 506. For example, the bonding feature 506 may only partially absorb the applied light, and the base optical component 504 or other part of the fixture may homogenize and/or reflect the light back to the bonding feature 506.

It should be noted that the configuration shown in FIG. 5 can achieve a similar result as the previous variations, e.g., localized and uniform heating of a bonding feature 506 by delivering laser light through one of the components being bonded. Further, as indicated by dashed lines, this variation may be optionally extended to include a second fiber 526 that delivers light to an exposed surface 528 of the base optical component 504, which may also be configured as an optical homogenizer between surfaces 508 and 528.

This option uses two fibers 522, 526 which may require more tooling and/or setup. However, this two-fiber-configuration may allow for lower power to be delivered through each of the respective optical components 502, 504 (e.g., reducing internal heating of those components), yet still deliver a desired amount of energy to the bonding feature 506. In some variations, light from the respective fibers 522, 526 may be phase adjusted to have an additive or cancelling phase at particular regions to more precisely shape the heating at the bonding feature 506. In other variations, the fibers 522, 526 may carry light of different wavelengths, e.g., optimized for the particular components 502, 504 through which the light is transmitted. In yet other variations, one or both of the fibers 522, 526 may be used for a preheat operation, and then just one of the fibers 522, 526 is used for reflow.

In the above embodiments, the exposed surface that receives the laser light for bonding is shown opposed to (e.g., parallel to and/or on an opposite surface from) the mounting surface of the same component (e.g., the attachable optical component). In some space-constrained situations, it may be desirable to use an alternate configuration, such as the example embodiment that is shown in the block diagram of FIG. 6. In this example, a submount (with or without laser diode, or may apply instead to a laser diode alone) is configured as an attachable optical component 602, and a slider is configured as a base optical component 604. A bonding feature 606 shown on a bonding region 608 of the base optical component 604 and faces a mounting surface 610 of the attachable optical component 602. It will be understood that the bonding feature 606 may be initially placed on either the mounting surface 610 or the bonding region 608.

Figure 6:
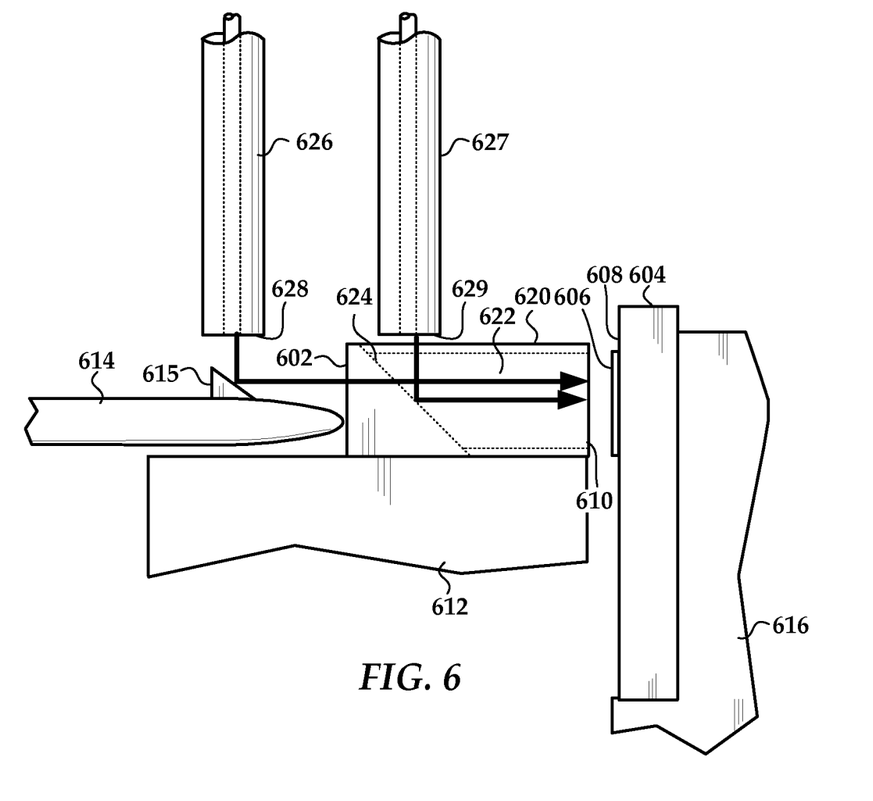

The attachable optical component 602 is held by fixture portions 612, 614, and the base optical component 604 is held by a fixture 616. In this case, the attachable optical component has an exposed surface 620 that is not opposite the mounting surface 610, but is at an angle to the mounting surface 610. The exposed surface 620 may be at this orientation due to a physical interference with the fixture/tooling, internal structure of the attachable optical component 602 (e.g., delicate or opaque features at the back surface), etc.

The attachable optical component 602 includes an optical homogenizer 622 (e.g., a prism or other optical homogenizing device). The laser light is provided by an optic fiber 626 with a cleaved output facet 628. In one example, fixture portion 614 includes a reflector 615 (e.g., mirror) that receives light from the optic fiber and directs it to the optical homogenizer 622. In another embodiment, the optical homogenizer 622 may include a reflector 624 (e.g., mirror) between the exposed surface 620 and bonding surface 610. In such a case, the optical homogenizer 622 and reflector 624 work together so that laser light directed to the exposed surface 620 from cleaved output facet 629 of optic fiber 627 uniformly heats the bonding feature 606 to bond the attachable optical component 602 to the base optical component 606 when placed in contact with one another.

The reflectors 615, 624 may be any shape (e.g., flat, curved) and may also include shape features that assist in homogenizing the laser light. As with the previous embodiments, these configurations may be used with a single optic fiber 626 or 627, or use additional fibers, e.g., at an exposed surface of the base optical component 604 and/or other surfaces of the attachable optical component 602.

Figure 7:
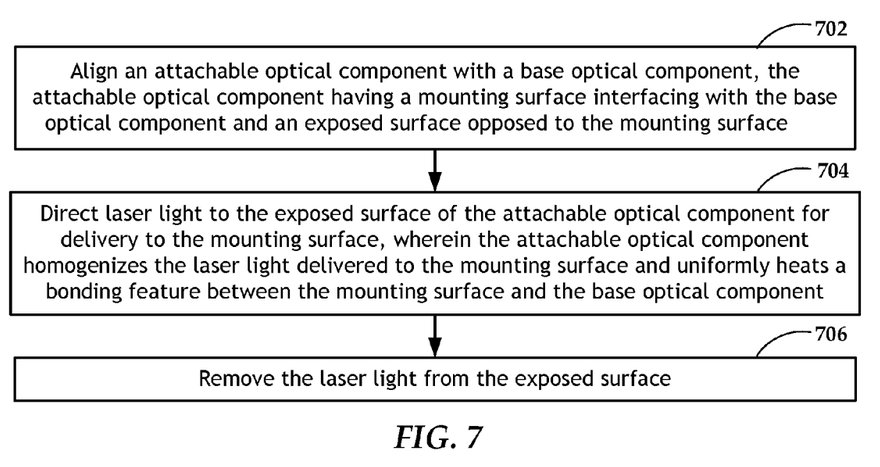
FIG. 7 is a flowchart illustrating a method according to an example embodiment.

In reference now to FIG. 7, a flowchart illustrates a method according to an example embodiment. The method involves aligning 702 an attachable optical component with a base optical component. The attachable optical component has a mounting surface interfacing with the base optical component and an exposed surface opposed to the mounting surface. Laser light is directed 704 to the exposed surface of the attachable optical component for delivery to the mounting surface. The attachable optical component guides and homogenizes the laser light delivered to the mounting surface and uniformly heats a bonding feature between the mounting surface and the base optical component. The laser light is removed 706 from the exposed surface. The directing 704 and removing 706 of the laser light bonds the attachable optical component to the base optical component via the bonding feature.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
    aligning an attachable optical component with a base optical component, the attachable optical component having a mounting surface interfacing with the base optical component and an exposed surface opposed to the mounting surface;
    directing laser light from a cleaved output facet of an optic fiber to the exposed surface of the attachable optical component for delivery to the mounting surface, wherein the attachable optical component guides and homogenizes the laser light delivered to the mounting surface and uniformly heats a bonding feature between the mounting surface and the base optical component; and
    removing the laser light from the exposed surface, wherein the directing and removing of the laser light bonds the attachable optical component to the base optical component via the bonding feature.

2. The method of claim 1, wherein the attachable optical component comprises a laser submount and the base optical component comprises a slider body.

3. The method of claim 2, wherein aligning the attachable optical component with the base optical component comprises aligning a laser diode mounted on the laser submount with a waveguide coupler of the slider body.

4. The method of claim 1, wherein the uniform heating of the bonding feature reduces thermal expansion of tooling used to align the attachable optical component with the base optical component.

5. The method of claim 1, wherein the cleaved output facet has a cross sectional area that does not extend beyond the exposed surface of the attachable optical component.

6. The method of claim 1, wherein the bonding feature comprises a solder pad.

7. An apparatus, comprising:
a first fixture that holds a base optical component that includes a bonding region;
a second fixture that aligns an attachable optical component so that a mounting surface of the attachable optical component faces the bonding region; and
an optic fiber having a cleaved output facet that directs laser light to an exposed surface of the attachable optical component that is opposed to the mounting surface, wherein the attachable optical component homogenizes and delivers the laser light to the mounting surface to uniformly heat the bonding region, and wherein heating of the bonding region bonds the attachable optical component to the base optical component.

8. The apparatus of claim 7, wherein the attachable optical component comprises a laser submount and the base optical component comprises a slider body.

9. The apparatus of claim 8, wherein the slider body comprises a waveguide coupler that is aligned with a laser diode mounted on the laser submount.

10. The apparatus of claim 7, wherein the bonding region comprises a solder pad.

11. The apparatus of claim 7, wherein the uniform heating of the bonding region reduces thermal expansion of the first fixture and the second fixture.

12. The apparatus of claim 7, wherein the cleaved output facet has a cross sectional area that does not extend beyond the exposed surface of the attachable optical component.

13. The apparatus of claim 7, wherein the optic fiber comprises a multimode fiber having a core diameter that is significantly smaller than outer dimensions of the exposed surface of the attachable optical component.

* * * * *